(12) United States Patent
Neumann et al.

(10) Patent No.: US 11,978,134 B2
(45) Date of Patent: May 7, 2024

(54) METHOD, COMPUTER PROGRAM PRODUCT, AND MICROSCOPY SYSTEM FOR DISPLAYING POLARIZING SAMPLES

(71) Applicant: Carl Zeiss Microscopy GmbH, Jena (DE)

(72) Inventors: Markus Neumann, Unterschleißheim (DE); Corinna Sommer, Munich (DE); Iris Grabmair, Munich (DE); Nicolas Voessing, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 58 days.

(21) Appl. No.: 17/680,765

(22) Filed: Feb. 25, 2022

(65) Prior Publication Data

US 2022/0284636 A1 Sep. 8, 2022

(30) Foreign Application Priority Data

Mar. 2, 2021 (DE) ........................ 10 2021 201987.0

(51) Int. Cl.
*G06T 11/00* (2006.01)
*G02B 21/36* (2006.01)
*G06T 7/30* (2017.01)

(52) U.S. Cl.
CPC ............ *G06T 11/00* (2013.01); *G02B 21/367* (2013.01); *G02B 21/368* (2013.01); *G06T 7/30* (2017.01); *G06T 2200/24* (2013.01); *G06T 2207/10056* (2013.01)

(58) Field of Classification Search
CPC ....... G06T 11/00; G06T 11/30; G02B 21/367; G02B 21/368

USPC ............... 345/659, 419; 348/208.99, E5.022
See application file for complete search history.

(56) References Cited

U.S. PATENT DOCUMENTS

| 9,294,680 | B1* | 3/2016 | Pavelle | ................ G02B 27/286 |
| 2009/0021598 | A1* | 1/2009 | McLean | ................... G01J 3/447 |
| | | | | 348/E5.022 |
| 2011/0018990 | A1* | 1/2011 | Komoto | ............... H04N 23/843 |
| | | | | 348/208.99 |
| 2013/0181984 | A1* | 7/2013 | Chen | ....................... G06T 15/10 |
| | | | | 345/419 |

FOREIGN PATENT DOCUMENTS

EP 3298582 3/2018

OTHER PUBLICATIONS

Taki Katsuhiko, Picture-Taking System, Image Processing Device, and Image Processing Method , Jul. 22, 2019, Nihon Visual Science Inc; Tokyo Metro Ind Tech Res Inst , JP2019120501 (A) paragraph 22-140 English.*

(Continued)

*Primary Examiner* — Prabodh M Dharia
(74) *Attorney, Agent, or Firm* — NIXON PEABODY LLP; Jeffrey L. Costellia

(57) ABSTRACT

The invention relates to a method for displaying polarizing samples, a microscopy system, and a computer program product. According to the invention, different types of polarization contrasts are to be prepared and provided for a common, simultaneous display on a user interface, wherein the same polarization angle is automatically displayed for all contrast types. If the selected polarization angle is changed, it should be changed synchronously in the display of all contrast types.

12 Claims, 1 Drawing Sheet

(56) References Cited

OTHER PUBLICATIONS

Taki Katsuhiko, Picture-Taking System, Image Processing Device, and Image Processing Method, Jul. 22, 2019, Nihon Visual Science Inc; Tokyo Metro Ind Tech Res Inst, JP2019120501 (A) paragraph 22-140 Japanese.*

Nakamura Shin Imaging Device Mar. 14, 2013 Hoya Corp JP2013051551 (A)—Mar. 14, 2013Paras. 18-58, Figures 1-9 English.*

Nakamura Shin Imaging Device Mar. 14, 2013 Hoya Corp JP2013051551 (A)—Mar. 14, 2013Paras. 18-58, Figures 1-9 Japanese.*

Germany Search Report for Application No. 10 2021 201 987.0, dated Sep. 15, 2021, 10 pages.

* cited by examiner

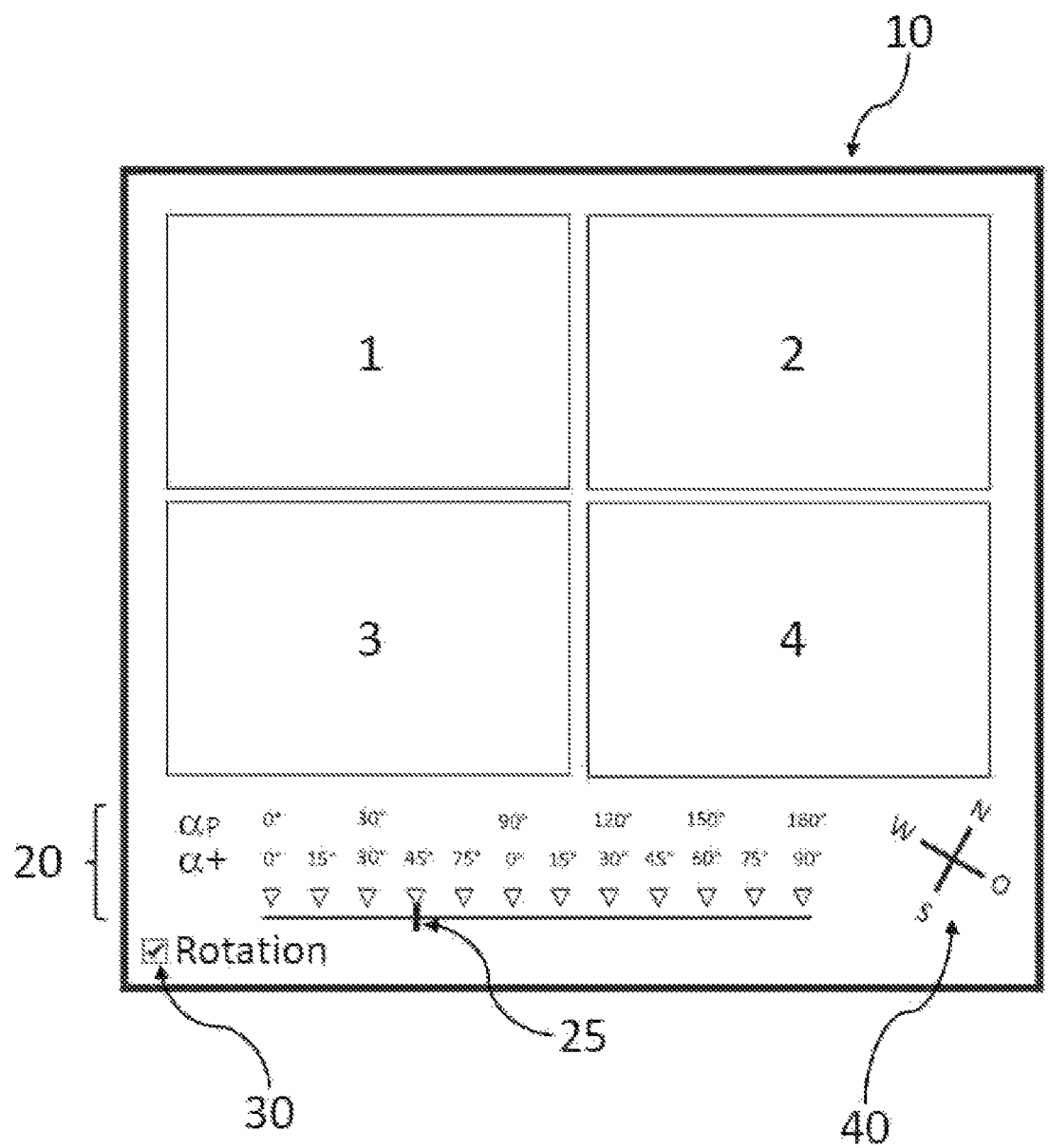

METHOD, COMPUTER PROGRAM PRODUCT, AND MICROSCOPY SYSTEM FOR DISPLAYING POLARIZING SAMPLES

BACKGROUND OF THE INVENTION

Field of the Invention

The invention relates to a method for displaying polarizing samples, a microscopy system, and a computer program product. According to the invention, different types of polarization contrasts are to be prepared and provided for a common, simultaneous display on a user interface, the same polarization angle being automatically displayed for all contrast types. If the selected polarization angle is changed, it should be changed synchronously in the display of all contrast types.

There are various contrast methods that can be used to highlight the structures of samples in microscopy. Polarization contrast is typically used to display optically birefringent structures. Two linear polarizers are usually required for this, which are arranged in the beam path in front of and behind the sample. Based on the direction of the microscope illumination, the first linear polarizer is referred to as the polarizer and the second linear polarizer is referred to as the analyzer. The directions of oscillation of the two elements are aligned with one another in such a way that they are in the so-called cross position. In this position, the light is completely absorbed if it passes through both optical elements and is not changed between them. If structures with birefringent properties are present within the sample, the linear oscillation direction of the light caused by the polarizer is changed for these structures. The extinction by the analyzer only eliminates the linearly oscillating light from the polarizer. The portions changed by the sample pass through the analyzer and can be recorded with a detector.

In order to obtain more information from a sample, it is rotated around its z-axis in a classic polarizing microscope using a turntable. The position of the sample changes with respect to the oscillation angle of the polarizers and thus also the detected sample information. This additional information is important, for example, for the analysis of thin sections of rock or cartilage components in pathological thin sections. However, since not all microscopes have the ability to incorporate a turntable, systems have been developed in which the angles of the polarizer and analyzer can be changed to mimic the effect of rotation. In these systems, the sample is fixed and the angle of the polarizers is changed to the same extent, so that the extinction can still be observed. The information that can be read out is identical to the classic variant with a turntable.

However, a rotatable analyzer cannot be provided in every system. Instead, the change in angle can be implemented using a defined number of analyzers with fixed directions of oscillation. These are incorporated into the system in such a way that they can be individually swiveled into the beam path by an electric drive. For example, the implementation can take place with a filter wheel with a plurality of differently oriented analyzers. To cover the possible extinction range with crossed linear polarization turns, six fixed angles from 0° (oriented north-south) to 75° are used, but more than six angles and/or different angles are also possible. The polarizer used in such a system can be rotated through 360° at the same time and is usually moved by an electric drive. However, it is also possible here to use a filter wheel with polarizers that are swiveled into the beam path at six fixed angles. Depending on the swiveled-in analyzer, the polarizer is preferably automatically positioned so that the cross position is present. If the polarizer and the analyzer are fully motorized and the sample can be repositioned in its x- and y-axes, it is possible to automatically record the sample with the set polarization angles. The different polarization angles are swiveled in one after the other and the entire surface of the sample is acquired without external intervention being necessary.

As a result of the known polarization structures, images are acquired which have a channel in the image for each fixed analyzer angle. However, a user typically wants or needs the information from all angles. For this reason, solutions have been developed in which polarization information can be simulated between the angles actually recorded by interpolation (also called fading).

Depending on the structure of the microscope, it is possible to display different polarization contrasts within one shot, such as circular polarization, crossed linear polarization, plane polarization, in which the polarizer and analyzer are parallel to each other and the illumination is only with linearly polarized light, or the pleochroic polarization without an analyzer. Additional channels such as fluorescence channels can also be added. However, this creates images that have a large number of channels. In order to analyze the polarization information, the user has to look through the different polarization contrast types and channels and not lose the overview while doing so. Even if the interpolation of images for angles between the angles actually recorded is known, a clear display of this plurality of channels is not known. A synchronous alignment of the individual images or channels in a display in a way in which the related channel information is combined as a single channel has not previously been known.

It is, therefore, the object of the invention to propose solutions as to how shots of polarizing samples can be clearly displayed. A goal here should be to provide the images of different polarization contrast types and optionally also images without polarization contrast in one view and to adapt the images of all contrast types synchronously to this angle when a selected polarization angle is changed.

The object of the invention is achieved with a method according to claim 1, a computer program product according to claim 8, and a microscopy system according to claim 9. Further preferred embodiments of the invention result from the other features mentioned in the dependent claims.

The method according to the invention for displaying polarizing samples provides for at least the following steps:
  arranging and aligning a sample in an observation system,
  acquiring at least two shots with at least one polarization contrast and different polarization angles,
  grouping the shots according to their polarization contrast type, and
  preparing and providing the images of all available groupings for simultaneous display on a user interface with one image each for the same polarization angle.

First, a sample to be examined is arranged and aligned in an observation system. Such an observation system is, for example, a microscope with an image acquisition device. The observation system should be designed in such a way that observation is possible with at least one polarization method. These methods include (but are not limited to) cross polarization, plane-parallel polarization, circular polarization, and/or pleochroic polarization.

After the sample has been arranged and aligned, at least two shots are acquired, these being acquired with at least one polarization contrast, which results in particular from one of the aforementioned polarization methods, and at different polarization angles. This polarization angle results from the position or alignment of the polarizer(s) and analyzer(s) with respect to one another or the alignment of the polarizer if no analyzer is provided, as is the case with pleochroic polarization.

For each polarization contrast method, at least two shots are acquired, which are acquired with polarization angles that differ from one another. Other shots can be acquired with other polarization contrast methods. Alternatively or additionally, it is possible to take more than two shots within a polarization contrast method. In this way, a sufficient number of channels of different angles is recorded so that the entire angular range in which polarization effects are to be expected can be covered.

The shots are then grouped according to their polarization contrast type, i.e. according to the polarization contrast method with which they were acquired. The grouping takes place depending on the selected polarization contrast type: in the case of circular polarization, a channel is usually recorded, which then counts as a grouping. With cross polarization, one channel is usually recorded per analyzer angle, with six channels typically being sufficient. In this case, the individual channels are part of a grouping and are combined into this. With pleochroic polarization, one channel is recorded for each freely adjustable polarization angle. Six channels are also typical here, which are combined to form a grouping.

In each grouping, the existing images are correlated with the associated polarization angle, so that the associated image can be retrieved when a specific polarization angle is selected. For the purposes of the invention, this applies to the preparation of the images. It can also be advantageous to use analyzer angle images twice if, for example, shots with cross polarization and with pleochroic polarization are to be compared. Thus, if the angular range for the pleochroic polarization is set at 0° to 150° and that of the cross polarization is set at 0° to 75°, the polarization angles of the cross polarization should be used twice, so that a shot of the cross polarization at an angle of 0° can be assigned to a respective shot of the pleochroic polarization of 0° and 90°. Preparation of the images can also be understood to mean that partial shots, that is to say shots of partial areas of a sample, are each combined into one image and, if necessary, smoothed with the aid of image processing algorithms.

Prepared in this way, all available groupings and the assigned images can be provided for a common display, in which all available groupings can be displayed simultaneously with one image each on a user interface, the images to be displayed each having the same or corresponding polarization angle. The particular shot which corresponds to a selected polarization angle to be viewed is selected from each grouping and made available for display. The groupings can be displayed, for example, by means of a grid-like arrangement of images on the user interface, each of which belongs to a grouping. Each of these images shows a shot with the polarization angle selected by a user in order to compare the images of the same sample with different polarization contrasts directly with one another. The respective image comes from the associated grouping in which the channels and thus the images with different polarization angles are combined or are present within the same polarization contrast method. Ideally, the selection of the image section with regard to the scaling factor and/or shift in each displayed grouping are tracked in the display.

This method makes it possible for a user to view a polarizing sample with different contrast methods in a simple manner, and that is specifically in all available contrast types at the same time within a user interface. In contrast to the manner from before, the user does not have to look through all the channels and keep an overview of which shots the he/she is currently viewing, i.e. which polarization contrast method and which polarization angle. By means of the previous grouping and provision of an image from each grouping for a common display, a comparison is created that can simplify and accelerate the user's work process.

In a first preferred embodiment of the method, further shots can be acquired and grouped without polarization contrast. These include shots in bright-field, shots with fluorescence contrasts, and the like, which are each acquired in one or more channels and grouped as such. Each of the resulting groupings can be displayed as a separate image on the user interface. This allows a user to compare the shots with polarization contrast with other shots so that all aspects of a sample can be examined and evaluated. This is very helpful when analyzing drill core material, for example, because minerals can be correlated with the structure in bright-field on the basis of their polarization effects, and, at the same time, neighboring organic structures can be identified based on their fluorescent properties. This synchronized display also makes it easier, for example, to find relevant regions of a sample using artificial intelligence methods (such as machine learning, deep neural networks, etc.) in which the user has to indicate the regions of interest. Since, as a rule, there is only one shot for the images acquired without polarization contrast, this does not change when the polarization contrast to be observed changes, but the image provided always remains the same.

In a second embodiment of the method according to the invention, it is provided that, by actuating a control element provided for this purpose on the user interface, it is possible to switch from a display with a first polarization angle to a display with a second polarization angle, the switch being displayed synchronously for each available grouping. It should thus be possible to switch between different displays with different polarization angles with a control element that is integrated into the user interface. If this is activated, a shot corresponding to the selected polarization angle is provided for each grouping so that it can be displayed on the user interface. The change in the display should take place synchronously and with the same effect for all groupings, so that the same change in the polarization angle is also visible on the user interface after the control element has been actuated for all groupings. Such a control element on the user interface can be, for example, a slider control that can be moved along a scale with polarization angles plotted. A circular or ring-shaped control element or an input field with numerical values for the desired angle can also be provided.

Alternatively or additionally, it is also provided within the meaning of the invention that any control element outside of the user interface, in particular a hardware control element, can be actuated with the same effect. It is essential to the invention that the selection and provision of the images or shots of the groupings, which correspond to the selected polarization angle, takes place with the actuation of a control element of whatever type.

It may be desirable to view the sample at an angle of polarization that was not recorded in one or more types of polarization contrast. In this case, it proves to be advantageous that an interpolated image is displayed in order to provide an image for which there is no shot with the selected polarization angle. For this purpose, an image is calculated from the existing shots, in particular the shots adjacent to the selected polarization angle. In the simplest case, this is done by means of a weighted calculation that corresponds to the position of the selected polarization angle between the polarization angles of the existing shots. This is also known as "fading" between shots.

In order to achieve greater accuracy when calculating the images, the interpolation should be carried out as trigonometric interpolation. The brightness value of each interpolated pixel is calculated, for example, with the help of a sine function and interpolation points that result from the associated pixels of the existing shots.

The images calculated in this way can then be made available for display on the user interface. If a sufficient number of these images, also referred to below as intermediate images, are calculated within a grouping and provided for display, a smooth transition between the polarization angles can be perceived when changing between polarization angles, at least for such a grouping.

For many users, the rotation of the sample table and thus also of the images is the expected behavior, especially with petrographic and mineralogical microscopes, and thus this rotation also important for a sample analysis that conforms to expectations. It is, therefore, provided in the method according to the invention that a synchronously rotated display of the images of all available groupings can be provided at the same time by actuating the control element for changing the selected polarization angle. This should be understood to mean that not only is the associated image provided at a selected polarization angle, but that it is also rotated through the selected angle. This should be done accordingly for each grouping, so that an image with the selected polarization angle is provided for each grouping, which image is also rotated through this angle. If there are groupings without polarization contrast, these are also or still rotated. When these rotated images are displayed, the user has the impression that the sample was acquired on a rotatable table. The expectation of the user with regard to the sample analysis can thus be fulfilled and the user can examine the sample as usual.

The above embodiment proves to be particularly advantageous in combination with the interpolation of intermediate images, since, in this way, a display can be generated which provides a smooth transition between the images in the individual rotation angles.

In order to give the user a better overview of the selected polarization angle, an orientation element is to be provided for display on the user interface, which orientation element shows the selected polarization angle. Such an orientation element helps to transfer the orientation of the polarizer and analyzer, which is usually set in petrographic or mineralographic microscopes, to images from a digital scanner. This is important because this orientation is critical for analyzing minerals. The marking in this case is usually in the form of a wind rose. Such an orientation element allows the user a quick overview of the present polarization angle and also of the display if it is rotated at the same time. Thus, it can be provided that, when the polarization angle changes, the wind rose mentioned by way of example rotates through the selected angle and thus displays it. With simultaneous rotation of the images, it can be provided that this wind rose remains in the north-south direction. Any other orientation element with which the polarization angle and possibly a simultaneous rotation can be displayed is also suitable. To make this possible, a corresponding display of the orientation element must also be provided after the polarization angle to be considered has been selected and/or a change in its display on the user interface is effected.

It can be useful that only preselected groupings are provided for display on the user interface. For example, if a user wishes to compare a smaller number of contrast methods than there are groupings available, the user should be able to select the desired groupings that are displayed. No image is then provided for unneeded or undesired groupings and, ideally, the space that is freed up on the user interface is used to display the groupings to be displayed in a larger size using the space that is freed up. The images are not lost in this case. This means that the user has a clearer display available in order to organize his/her work more effectively.

The method according to the invention is advantageously implemented with the aid of a computer program product which contains instructions for carrying out the method according to the invention. These instructions include, in particular, the activation of image acquisition and the setting of the angles of the polarizer(s) and/or analyzer(s), automatic grouping of images, the preparation and provision thereof for display on a user interface, and/or the interpolation of the intermediate images.

A microscopy system for displaying polarizing samples should have at least one observation system, a computing unit, and a display device. As already stated, the observation system is, for example, a microscope with an image acquisition device. The observation system should be designed in such a way that it is possible to observe and record at least two images with at least one polarization contrast method and different polarization angles.

The computing unit should be designed and configured for grouping the images according to their polarization contrast type as well as their preparation and provision for a display device. For example, this can be achieved by a sufficiently powerful computer that is connected to the observation system, or the computing unit is part of the observation system. In particular, the computing unit should have sufficient computing power, memory space, and preferably a computer program product to carry out the method according to the invention or at least the interpolation.

Finally, a display device should be part of the microscopy system according to the invention, on which a user interface is provided and on which all available groupings are displayed simultaneously with one image each with the same polarization angle, with the aid of the information or images provided. Of course, a reduction to the desired groupings to be displayed should also be possible.

To acquire the shots with different polarization angles, the microscopy system should have a rotatable table, a rotatable polarizer, a rotatable analyzer, a filter wheel with differently aligned analyzers, and/or an on-chip polarizer. The use of these elements known per se individually or in a meaningful combination ensures that the shots of a sample are acquired with different polarization angles and made available for display on the user interface.

The method, computer program product, and microscopy system according to the invention enable a user to perform a sample examination that conforms to expectations, in which the user, in optional configurations, has the impression of having acquired the sample with a rotatable table. The lack of a turntable can be compensated for in this way. In addition, the synchronized display of images with different polarization contrasts allows the user to work clearly and effectively, since the user can compare the various methods directly without having to laboriously maintain an overview.

The various embodiments of the invention mentioned in this application can be advantageously combined with one another, unless stated otherwise in the individual case.

The invention is explained below in exemplary embodiments with reference to the accompanying drawings. The following is shown:

BRIEF DESCRIPTION OF DRAWINGS

FIG. 1 an exemplary embodiment of the user interface for displaying polarizing samples.

DETAILED DESCRIPTION OF THE INVENTION

FIG. 1 shows an exemplary embodiment of the user interface 10 that can be displayed using the method according to the invention. It is displayed on a display device of a microscopy system and was provided using a computer program product that executes the method according to the invention.

First, images of a sample arranged and aligned on a sample table were acquired with an observation system. In this exemplary embodiment, these images were acquired in bright-field by means of cross polarization, by means of circular polarization, and by means of plane polarization. The shot in bright-field forms a first grouping 1. The shots of the different polarization methods are acquired at different angles and are each grouped: the shots of cross polarization form grouping 2, those of circular polarization form grouping 3, and those of pleochroic polarization form grouping 4.

A scale 20 is provided on the user interface 10, under the display areas for groupings 1 to 4, which scale indicates the angles for the cross polarization $\alpha+$ and for the plane polarization $\alpha_P$. Arranged underneath is a control element 25 in the form of a slider control with which a user can select the polarization angle to be viewed along the scale 20. An angle of 45° is selected in FIG. 1.

According to the invention, for each of groupings 1 to 4, the image is selected and provided from the shots in respective groups 1 to 4, which image corresponds to a polarization angle of 45°, or precisely this shot for grouping 1 of the bright-field. If no shot is available for the selected polarization angle, an intermediate image for the selected angle is calculated by means of trigonometric interpolation and made available to be displayed.

If the user moves the control element 25 along the scale 20, the associated images are again provided for the polarization angle then selected so that the images can be displayed. The intermediate images are interpolated in this case as well if necessary.

The images provided are transmitted from the computing unit of the microscopy system (not shown) to its display device, where they can be displayed, for example, in the manner shown in FIG. 1.

Furthermore, a selection box 30 is provided on the user interface, which makes it possible to effect a rotation of the images that is synchronized with the selection of the polarization angle to be displayed. If the selection is confirmed here, as symbolized by the checkmark, not only the images for the selected polarization angle are provided, but also the images rotated through this angle so that the user has the impression of using a turntable when viewing them.

An orientation element 40 in the form of a wind rose indicates the selected polarization angle of 45°. The next time the polarization angle to be displayed is changed, which then takes place with the selected synchronous rotation, the wind rose is provided and displayed in a north-south direction, since the rotation is coupled with the polarization angle to be displayed.

LIST OF REFERENCE NUMERALS 1 to 4 Images of the groupings
10 User interface
20 Display of polarization contrast type and angle
25 Control element
30 Selection of synchronous rotation
40 Orientation element

The invention claimed is:

1. A method for displaying polarizing samples, with at least the following steps:
arranging and aligning a sample in an observation system,
acquiring at least two shots with at least one polarization contrast and different polarization angles,
grouping the shots according to their polarization contrast type, and
preparing and providing the images of all available groupings for simultaneous display on a user interface with one image each for the same polarization angle.

2. The method according to claim 1, wherein further shots are acquired and grouped without polarization contrast.

3. The method according to claim 1, wherein, by actuating a control element provided for this purpose on the user interface, it is possible to switch from a display with a first polarization angle to a display with a second polarization angle, wherein the switch is displayed synchronously for each available grouping.

4. The method according to claim 1, wherein an interpolated image is displayed, in particular an image generated by means of trigonometric interpolation, to provide an image for which there is no shot with the selected polarization angle.

5. The method according to claim 1, wherein, by actuating the control element for changing the selected polarization angle, a synchronously rotated display of the images of all available groupings is provided at the same time.

6. The method according to claim 1, wherein an orientation element is provided for display on the user interface, which element displays the selected polarization angle.

7. The method according to claim 1, wherein only previously selected groupings are provided for display on the user interface.

8. A non-transitory computer-readable storage medium storing a computer program product containing instructions for carrying out the method according to claim 1.

9. The method according to claim 1, wherein the acquiring the at least two shots with the at least one polarization contrast and different polarization angles includes acquiring at least two shots for each of at least two polarization contrasts and different polarization angles.

10. A microscopy system for displaying polarizing samples, in particular with a method according to claim 1, comprising:
an observation system designed to acquire at least two shots of a sample with at least one polarization contrast and different polarization angles,
a computing unit designed and configured for grouping the shots according to their polarization contrast type, as well as for the preparation and provision thereof for a display device, and
a display device, on which a user interface is provided and on which all available groupings are displayed simultaneously with one image each with the same polarization angle.

11. The microscopy system according to claim 10, wherein it has a rotatable table, a rotatable polarizer, a rotatable analyzer, a filter wheel with differently aligned analyzers, and/or an on-chip polarizer in order to acquire the shots with different polarization angles.

12. The method according to claim 9, wherein the at least two polarization contrasts are selected from cross polarization, plane-parallel polarization, circular polarization, and pleochroic polarization.

\* \* \* \* \*